Figure 1:
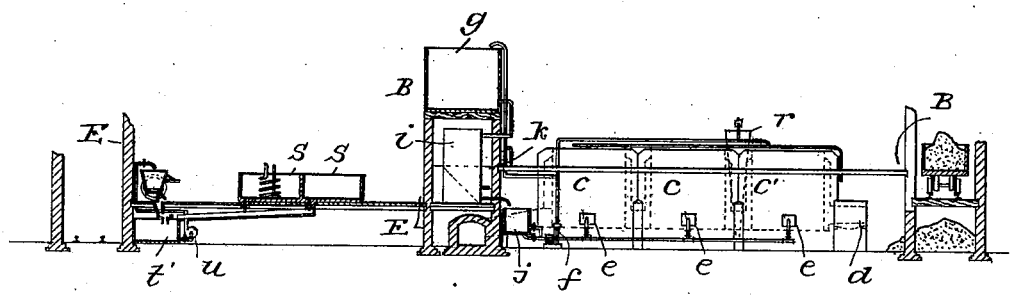

No. 668,671. Patented Feb. 26, 1901.
H. BAKER & E. HAWORTH.
METHOD OF OBTAINING SODIUM SULFATE FROM BRINES.
(Application filed Mar. 12, 1900.)
(No Model.) 2 Sheets—Sheet 1.

WITNESSES

INVENTORS
Harry Baker
Edward Haworth

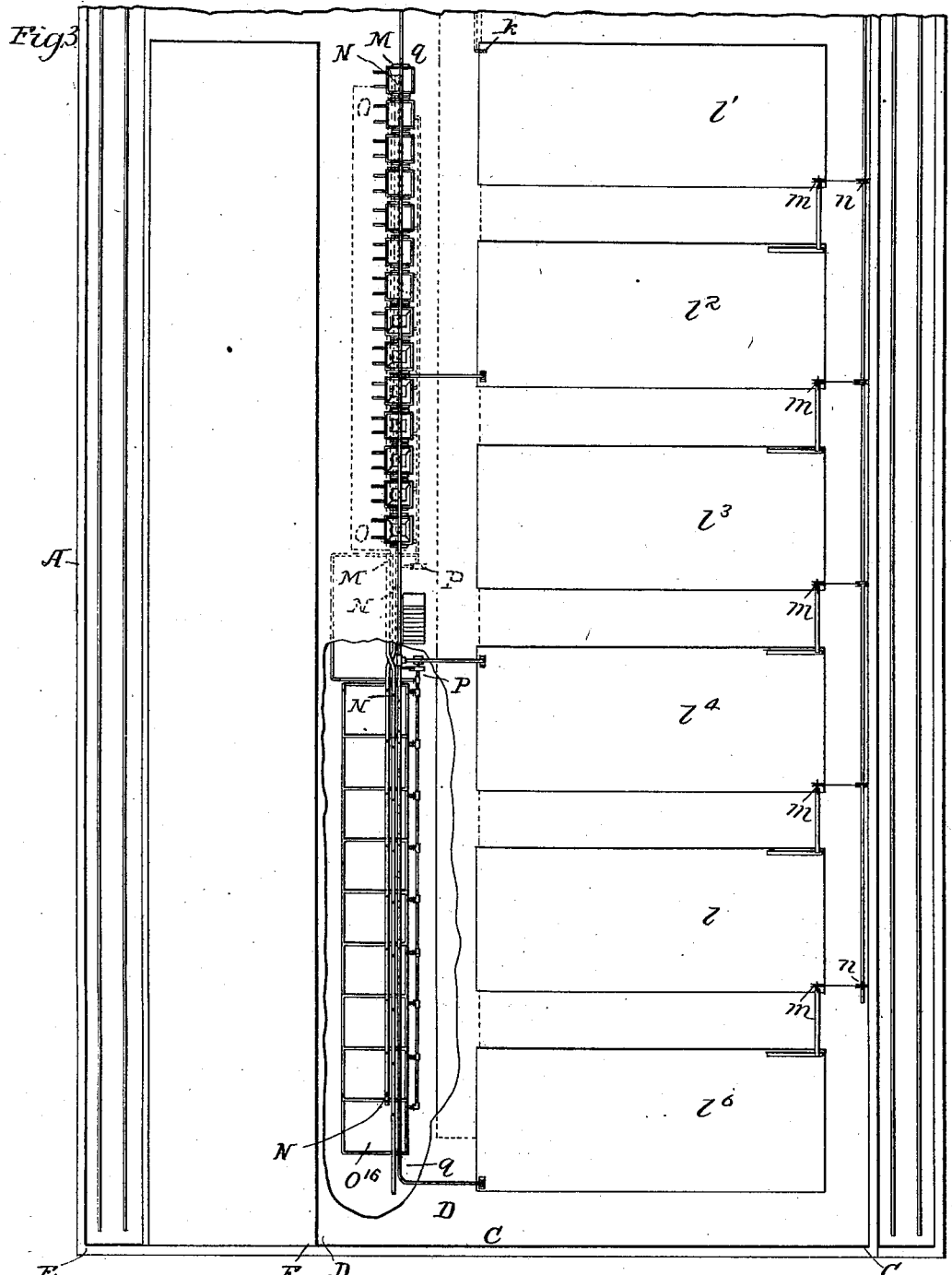

UNITED STATES PATENT OFFICE.

HARRY BAKER AND EDWARD HAWORTH, OF RUNCORN, ENGLAND.

METHOD OF OBTAINING SODIUM SULFATE FROM BRINES.

SPECIFICATION forming part of Letters Patent No. 668,671, dated February 26, 1901.

Application filed March 12, 1900. Serial No. 8,373. (No specimens.)

*To all whom it may concern:*

Be it known that we, HARRY BAKER and EDWARD HAWORTH, subjects of the Queen of Great Britain, residing at Weston Point, Runcorn, in the county of Chester, England, have invented a certain new and useful Improvement in and Connected with the Production of Pure Salt and Glauber Salt from Brine, of which the following is a specification.

It is well known that all natural brines and also artificial brines made by dissolving rock salt that are suitable for making salt for culinary and manufacturing processes contain as principal impurity calcium sulfate and in smaller quantities the sulfates or chlorids of magnesium, chlorid of calcium, sulfate of soda, and bicarbonate of iron and of lime. Many processes have been devised for more or less completely purifying the brine to be used in salt-making or the salt after it has been made; but where such processes are cheap, adding but little to the cost of producing salt without such purification, they are also exceedingly inefficient, and where they are efficient and yield a chemically-pure salt they are also so expensive as to have prohibited hitherto the manufacture of chemically-pure salt for general purposes. Thus the removal of iron, magnesia, and lime by the well-known chemical reagents lime and sodium carbonate and of sulfates by the well-known chemical reagent barium chlorid is complete; but the cost of the brine is increased tenfold and the cost of the salt is at least doubled, and this mainly because of the expensiveness of barium chlorid. Recently in the progress of electrochemical and other chemical manufactures it has become important to obtain chemically-pure salt as cheaply as possible and in large quantities—hence the present invention. The iron, magnesia, and lime are removed by the well-known chemical reagents lime and carbonate of sodium, and the rapid settling is assisted by a gentle heat in the first case and by a heat of, say, 50° to 70° centigrade in the last case. There is thus obtained a salt solution which contains as its only impurity sodium sulfate and a very small quantity of excess of sodium carbonate. It is known as a laboratory operation for the preparation of small quantities of pure salt that as such brine is gradually evaporated the salt which first separates is after removal of the mother-liquor by draining and pressing between blotting-paper chemically pure; but this can only be carried on for a short time, as the salt becomes gradually more impure, until the method becomes useless, and there then remains a quantity of brine containing the major part of the sulfate of soda, and this is entirely useless and waste. Castner, in British specification No. 21,284 of 1898, has described how the sodium sulfate may be removed from the solid salt by fractional washing of such salt with a brine saturated as to sodium chlorid and containing little or no sodium sulfate; and the present invention consists largely of improvements on that described by Castner and gives a continuous method of preparing a salt of any desired degree of purity and recovers all the salt and also all the sodium sulfate (each of them in a state of purity) from the above-named waste liquor.

According to this invention the brine is first to be purified by means of lime and soda-ash in the ordinary way, so as to produce a brine containing only sodium chlorid and sodium sulfate in solution. Instead of feeding this brine into one evaporating-pan, as described by Castner, it is proposed to use a series of evaporating-pans, all the brine required for all the pans being fed into the first one, and the brine not evaporated in that pan being passed on by means of a pipe, conduit, pump, or any suitable method to the next pan in the series. Similarly the brine not evaporated in the second pan will be passed to the third pan, and so on. As the brine which is fed to the pans will not be saturated with sodium sulfate, the salt deposited in the first pan will be pure sodium chlorid, wetted with a brine containing more sodium sulfate relative to sodium chlorid than the original brine. The deposition of pure sodium chlorid will continue in succeeding pans until a pan is reached in which the brine becomes saturated with sodium sulfate at the temperature at which the evaporation takes place. When this stage is reached, the salt deposited in the evaporating vessel will contain a new constituent—viz., solid sodium sulfate—and in all succeeding pans, the feed-brine being saturated with sodium sulfate, the condition of the pans will be uniform and constant and the salt fished contain a maximum of solid sodium sulfate. It has been found by experiment that if the evaporation is carried out at about 190° Fahrenheit the brine becomes saturated with sodium sulfate when the proportion of sodium chlorid to sodium sulfate in the brine becomes as one hundred to nineteen, and this proportion varies with the temperature at which the evaporation takes place. Ordinary brine purified as above described contains about one hundred parts of sodium chlorid to 1.6 parts of sodium sulfate, and therefore it is possible to obtain 91.6 parts of sodium chlorid free from solid sodium sulfate and ten parts of a salt containing 8.4 parts of sodium chlorid and 1.6 parts of solid sodium sulfate. In practice these figures will probably only be approximately obtained, owing to losses in working and the removal from the pans of sodium sulfate not solid, but dissolved in the brine, which wets the salt even after draining as long as convenient. The number of pans in series may be varied according to circumstances and requirements; but generally the best results will probably be obtained with the most pans. It is obvious that by stopping the number of pans in series at a suitable point a solid salt may be obtained from the last pan containing sodium chlorid and solid sodium sulfate in any proportion between one hundred and nineteen and one hundred and *nil*, if the evaporation is carried out at about 190° Fahrenheit. If the evaporation is carried out at any other temperature, the ratio one hundred to nineteen will change as the solubility of sodium sulfate in the brine changes with the temperature.

In view of the increased output of bleach from electrolytic processes a salt containing nineteen parts of sodium sulfate to one hundred parts sodium chlorid would be useful in the manufacture of salt cake. Having described how to produce salts containing any amount of solid sodium sulfate from nothing to a maximum, it remains to describe how to obtain from these pure salt and also Glauber salt.

*Preparation of pure salt from portions containing no solid sodium sulfate.*—To obtain salt from those portions containing no solid sodium sulfate, the brine which wets the salt must be removed by some means. Simple drainage will not be sufficient to effect this if a pure salt is required, nor would any of the well-known methods of separating liquids from solids give a very satisfactory result. A pure salt may, however, be obtained by replacing the brine containing sodium sulfate with a brine free from sodium sulfate, or nearly so. The salt may be drawn into water-tight carts, allowed to drain a convenient length of time, and the drainage returned to the pan. A brine containing less sodium sulfate than the brine in the pan would then be pumped onto the salt, this in its turn drained off and replaced by a still purer brine, and so on until finally pure brine containing no sodium sulfate would be pumped onto the salt. In this way a salt free from all impurities may be obtained. The pure brine for washing may be obtained from the original brine by precipitating the sulfate with barium chlorid or other reagent or by dissolving pure salt (as the salt obtained by the purification process) in water. It is obvious that a salt containing small quantities of sodium sulfate may be obtained by stopping the washing at any desired point. In this case the original brine only may be used in the washing, or it may be required to be supplemented by a quantity of pure brine. The number of washings will vary with the amount of sodium sulfate in the brine wetting the salt originally and the degree of purity required in the finished salt and may be from one to as many as twelve. Some of the brine strongest in sodium sulfate having been removed to treat the salt containing solid sodium sulfate as described in the next paragraph, the wash-brines may all be thrown forward and the series completed by the addition of the required quantity of new washing-brine. The amount of new brine required will be about five gallons per three hundred pounds of salt, but will of course vary with the composition of the raw brine and the purity of the salt to be produced.

*Preparation of Glauber salt and pure salt from portions containing solid sodium sulfate.*—To prepare Glauber salt from the portions containing solid sodium sulfate, the wash-brine containing most sodium sulfate in solution may be pumped into the carts and the temperature brought to about 33° centigrade. The brine will dissolve out the solid sodium sulfate until it is saturated, and this point is reached when it contains approximately 6.5 per cent. sodium sulfate, (or twenty-eight to thirty parts sodium sulfate to one hundred parts salt.) The salt is to be treated with brine at 33° centigrade in such a manner that almost all the solid sodium sulfate is dissolved and the wash-brine is brought up to saturation. A second washing with another portion of similar brine will remove all the solid sodium sulfate, and the salt may then be washed pure, as described in the previous section. The wash-brine containing six and one-half per cent. sodium sulfate on cooling will deposit Glauber salt, along with small quantities of sodium chlorid. If a purer form of Glauber salt is required, it may be obtained by repeated washings with small quantities of water, which will dissolve out the sodium chlorid without seriously dissolving the Glauber salt, while if the utmost purity is required, by recrystallizing the washed crystals. All wash liquor not fully saturated with sodium chlorid may be utilized for washing further quantities of Glauber salt until a saturated solution of sodium chlorid is obtained, and such liquors may then be passed to the evaporating-pans for obtaining the solid salt therefrom. The brine from which the Glauber salt has deposited is returned either to the washing-tanks or to the evaporating vessels, as desired, so that nothing is lost.

The accompanying drawings illustrate a form of plant by which the process may be conveniently carried out.

Figure 2:
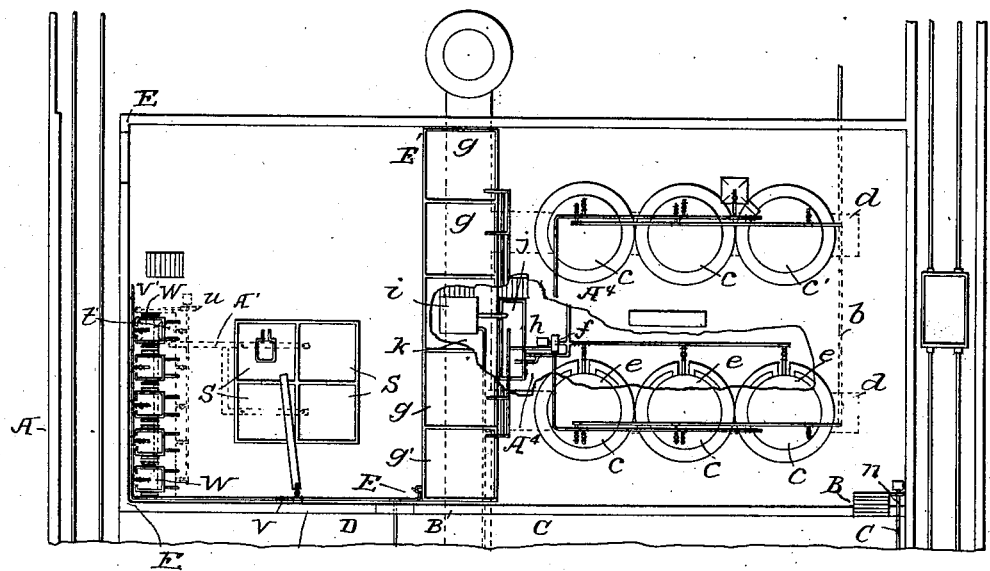

In said drawings, Figure 1 is a sectional elevation on the lines A, A', $A^2$, $A^3$, $A^4$, and $A^5$ of Fig. 2, which, with Fig. 3, represents a general plan of the plant.

B B B B represent the brine-purification house; $b$, a brine-supply pipe with distributing-taps; $c'$ and $c$, precipitating-tanks; $d$, firing for same; $e$, outlet-pipes for liquor connected to pumps $f$, the delivery of which can be taken to tanks $c'$ or $c$ or to store-tanks $g$ and $g'$.

$h$ indicates a filter-press and pump for removing precipitates from tanks $c$ and $c'$ without waste of liquor.

$i$ is a filter to remove all traces of suspended matter from the brine from tanks $g$ and $g'$ before it goes to the evaporating-pans. The dirty flushings of the filter are received in $j$ and thence are removed by pumps $f$. The tanks $c'$ and $c$ are provided with any convenient means for agitating their contents. The clear brine from filter $i$ enters the pan-house by pipe $k$.

C C C C represent the evaporating-pan house.

$l'$ $l^2$ $l^3$ $l^4$ $l^5$ $l^6$ are the evaporating-pans, fired in the usual way. All the brine enters $l'$ by the pipe $k$, and the excess is removed by pump $m$ and directed by chutes into pan $l^2$. The pump is driven from shafting $n$. By similar pumps and chutes the excess brine is passed on through the other pans to $l^6$.

D D D D represent the salt-washing house, which may be of two floors. On the left of the drawings a set of fourteen wash-carts and the flooring are supposed to be removed to show the arrangements below.

M M represent a set of carts containing the wet salt drawn from some one pan. The carts contain false bottoms covered with canvas, and the liquor passing out by the taps runs through small holes in the floor into chute N below. Under the chute is a long set of water-tight tanks O, into any of which the draining liquor may be directed by drawing a suitable plug in the chute. From any of the tanks O the liquor may be drawn through cock and main pipe by pump $p$ and delivered by mains $q$ and cocks into any of the carts M or in several of the pans $l$ or in the recovery-house E E E E. Liquor for washing the salt in carts M is obtained when desired from tank $g'$, which may contain pure sodium-chlorid solution, obtained by a final precipitation with barium chlorid effected in tanks $r$ and $c'$, or the liquor for washing may be water obtained from cock V'.

No heating or cooling arrangement is shown in tank $O^{16}$, as by judicious work such heating or cooling can be dispensed with; but in any case a simple coil of lead pipe connected to a supply of cold water or to a supply of steam suffices.

E E E E represent the recovery-house, supplied with the brine (containing the maximum of sodium sulfate) from tank $O^{16}$ by main $q$, which is received into crystallizing-tanks S, which to accelerate the cooling may contain coils of piping through which cold water flows or through which an artificially-cooled liquid may be passed from a refrigerating-machine. Neither the mains nor the machinery for this purpose are shown in the drawings, as they are of ordinary and known constructions.

After the separation of the impure Glauber salt the mother-liquid is drawn off by taps into the chutes below leading to the tank $t'$, whence it is sucked by pump $u$ and delivered on opening cock into the main $q$, by which it is returned to pan $l^6$. The crystals of Glauber salt are removed from tanks S into carts W, (similar to the carts M,) where they drain and the drainage enters tank $t'$. The cocks on the carts are then closed, and cold water is received through valve V' to wash the Glauber salt, which is accomplished in the same way as the washing of the salt, and the wash liquors when ultimately saturated with salt are returned to pan $l^6$. The washed crystals may be recrystallized if desired to be specially pure.

F F F F represent a storehouse for salt served by a railway.

The apparatus hereinbefore indicated forms no part of the present invention, it being a combination of well-known arrangements for evaporating brine.

What is claimed is—

1. The process of producing pure salts from brine, consisting in first removing from said brine all its salts except sodium chlorid and sodium sulfate, then evaporating the brine so as to cause practically-pure sodium chlorid wetted with a solution containing a proportion of sodium sulfate to be deposited, and continuing the evaporation in a series of separate vessels so as to cause the proportion of sodium sulfate to sodium chlorid in the brine wetting the salt deposited to increase with each partial evaporation until the brine approaches or becomes saturated with sodium sulfate.

2. The process of producing pure salts from brine, consisting in first removing from said brine all its salts except sodium chlorid and sodium sulfate, then evaporating the brine so as to cause practically-pure sodium chlorid wetted with a solution containing a proportion of sodium sulfate to be deposited, continuing the evaporation in a series of separate vessels so as to cause the proportion of sodium sulfate to sodium chlorid in the brine wetting the salt deposited to increase with each partial evaporation until the brine becomes saturated with sodium sulfate, causing a mixed salt of sodium chlorid and sodium sulfate to be deposited, and continuing the process until a salt is produced containing the maximum proportion of solid sodium sulfate.

3. The process of producing pure salt from brine, consisting in first removing from said brine all its salts except sodium chlorid and sodium sulfate, then evaporating the brine so as to cause practically-pure sodium chlorid wetted with a solution containing a proportion of sodium sulfate to be first deposited, draining such salt, and submitting it to a series of washings with solutions containing a continuously less proportion of sodium sulfate and a continuously greater proportion of sodium chlorid until the desired purity is attained.

4. The process of producing pure salts from brine, consisting in first removing from said brine all its salts except sodium chlorid and sodium sulfate, then evaporating the brine so as to cause practically-pure sodium chlorid wetted with a solution containing a proportion of sodium sulfate to be deposited, continuing the evaporation in separate vessels so as to cause the proportion of sodium sulfate to sodium chlorid in the brine wetting the salt deposited to increase and continuing the process until the brine becomes saturated with sodium sulfate, causing a mixed salt of sodium chlorid and sodium sulfate to be deposited and continuing the process further so as to produce a salt containing the maximum proportion of solid sodium sulfate, then treating at a temperature of about 33° centigrade such salts with a wash-brine containing sodium sulfate in solution yet below the maximum amount until the solid sodium sulfate has been dissolved out and a solution is obtained saturated with sodium sulfate, then cooling the wash liquors containing the sodium sulfate, and depositing the sodium sulfate in a solid form.

5. The process of producing pure salts from brine, consisting in first removing from said brine all its salts except sodium chlorid and sodium sulfate, then evaporating said brine so as to cause practically-pure sodium chlorid wetted with a solution containing a proportion of sodium sulfate to be deposited, continuing the evaporation in a series of separate vessels so that the proportion of sodium sulfate to sodium chlorid in the brine wetting the salt deposited increases and continuing the process and evaporation until the brine becomes saturated with sodium sulfate, causing a mixed salt of sodium chlorid and sodium sulfate to be deposited and further continuing the process so as to produce a salt containing the maximum proportion of solid sodium sulfate, then treating at a temperature of about 33° centigrade such salts with a wash-brine containing sodium sulfate in solution until the solid sulfate has been dissolved out, then removing the solution so formed, and washing the remaining salt with solutions of sodium chlorid containing continuously less proportions of sodium sulfate so as to remove any remaining sodium sulfate and leave pure sodium chlorid as a solid salt.

In testimony whereof we have hereunto set our hands in the presence of two subscribing witnesses.

HARRY BAKER.
EDWARD HAWORTH.

Witnesses:
NORMAN L. BOWTELL,
PERCY R. ALLEN.